(12) United States Patent
Saucier, Jr. et al.

(10) Patent No.: US 11,124,092 B2
(45) Date of Patent: Sep. 21, 2021

(54) TRANSFER SEAT AND METHOD

(71) Applicant: Ricon Corp., San Fernando, CA (US)

(72) Inventors: Stanton D. Saucier, Jr., Tarzana, CA (US); Lluno Cervera, Panorama City, CA (US)

(*) Notice: Subject to any disclaimer, the term of this patent is extended or adjusted under 35 U.S.C. 154(b) by 98 days.

(21) Appl. No.: 16/529,912

(22) Filed: Aug. 2, 2019

(65) Prior Publication Data

US 2019/0351791 A1 Nov. 21, 2019

Related U.S. Application Data

(60) Continuation of application No. 15/718,708, filed on Sep. 28, 2017, now Pat. No. 10,384,569, which is a division of application No. 14/899,250, filed as application No. PCT/US2014/044355 on Jun. 26, 2014, now Pat. No. 9,783,081.

(60) Provisional application No. 61/839,635, filed on Jun. 26, 2013.

(51) Int. Cl.
| | |
|---|---|
| *B60N 2/14* | (2006.01) |
| *B60N 2/24* | (2006.01) |
| *B60N 2/02* | (2006.01) |
| *B60N 2/06* | (2006.01) |

(52) U.S. Cl.
CPC ............ *B60N 2/14* (2013.01); *B60N 2/0228* (2013.01); *B60N 2/0232* (2013.01); *B60N 2/0296* (2013.01); *B60N 2/067* (2013.01); *B60N 2/245* (2013.01); *B60N 2002/0256* (2013.01)

(58) Field of Classification Search
CPC .. B60N 2/0228; B60N 2/0296; B60N 2/0244; B60N 2/14; B60N 2/245; B60N 2/06; B60N 2/0256

USPC .......... 296/65.07, 68.1, 65.06, 65.13–65.15, 296/65.03; 297/344.21–344.24, 344.1; 248/503.1

See application file for complete search history.

(56) References Cited

U.S. PATENT DOCUMENTS

| | | | |
|---|---|---|---|
| 3,383,477 A | 5/1968 | Swisher | |
| 4,479,038 A * | 10/1984 | Marhold | ............ G05G 9/04785 200/553 |
| 4,754,946 A | 7/1988 | Constantin | |
| (Continued) | | | |

FOREIGN PATENT DOCUMENTS

| | | | | |
|---|---|---|---|---|
| GB | 1198905 | * | 7/1970 | ............. A61G 5/042 |
| WO | 1982001313 A1 | | 4/1982 | |

OTHER PUBLICATIONS

Australian Examination Report No. 1 for Standard Patent Application, Application No. 2018206789, dated Aug. 3, 2019.

(Continued)

*Primary Examiner* — Dennis H Pedder
(74) *Attorney, Agent, or Firm* — Christopher R. Carroll; The Small Patent Law Group LLC

(57) ABSTRACT

An operating control for a transfer seat includes at least one rotation control switch disposed on a first portion of a user control interface box body. The rotation control switch is configured to be actuated to control rotational movement of the transfer seat about an axis. A directional control switch is disposed on a second portion of the user control interface box body. The directional control switch is configured to be actuated to control forward and rearward movement of the transfer seat base and upward and downward movement of the transfer seat.

20 Claims, 9 Drawing Sheets

(56) References Cited

U.S. PATENT DOCUMENTS

| | | | | |
|---|---|---|---|---|
| 4,846,529 A | * | 7/1989 | Tulley | B60N 2/0232 |
| | | | | 297/344.23 |
| 5,350,032 A | | 9/1994 | Smith | |
| 5,455,399 A | | 10/1995 | Kohno et al. | |
| 5,844,182 A | | 12/1998 | Hirano et al. | |
| 5,941,498 A | * | 8/1999 | Hoshihara | B60N 2/146 |
| | | | | 248/550 |
| 6,894,234 B1 | * | 5/2005 | Sottong | B60N 2/0228 |
| | | | | 200/17 R |
| 7,246,856 B2 | | 7/2007 | Kruse et al. | |
| 8,232,486 B2 | | 7/2012 | Ujimoto et al. | |
| 2006/0243566 A1 | | 11/2006 | Sakai | |
| 2007/0080003 A1 | | 4/2007 | Koerlin et al. | |

OTHER PUBLICATIONS

Australian Examination Report No. 1 for Standard Patent Application, Application No. 2018206784, dated Sep. 12, 2019.
Canadian Office Action dated Jul. 2, 2020 for corresponding application No. CA2911423. (3 pages).

* cited by examiner

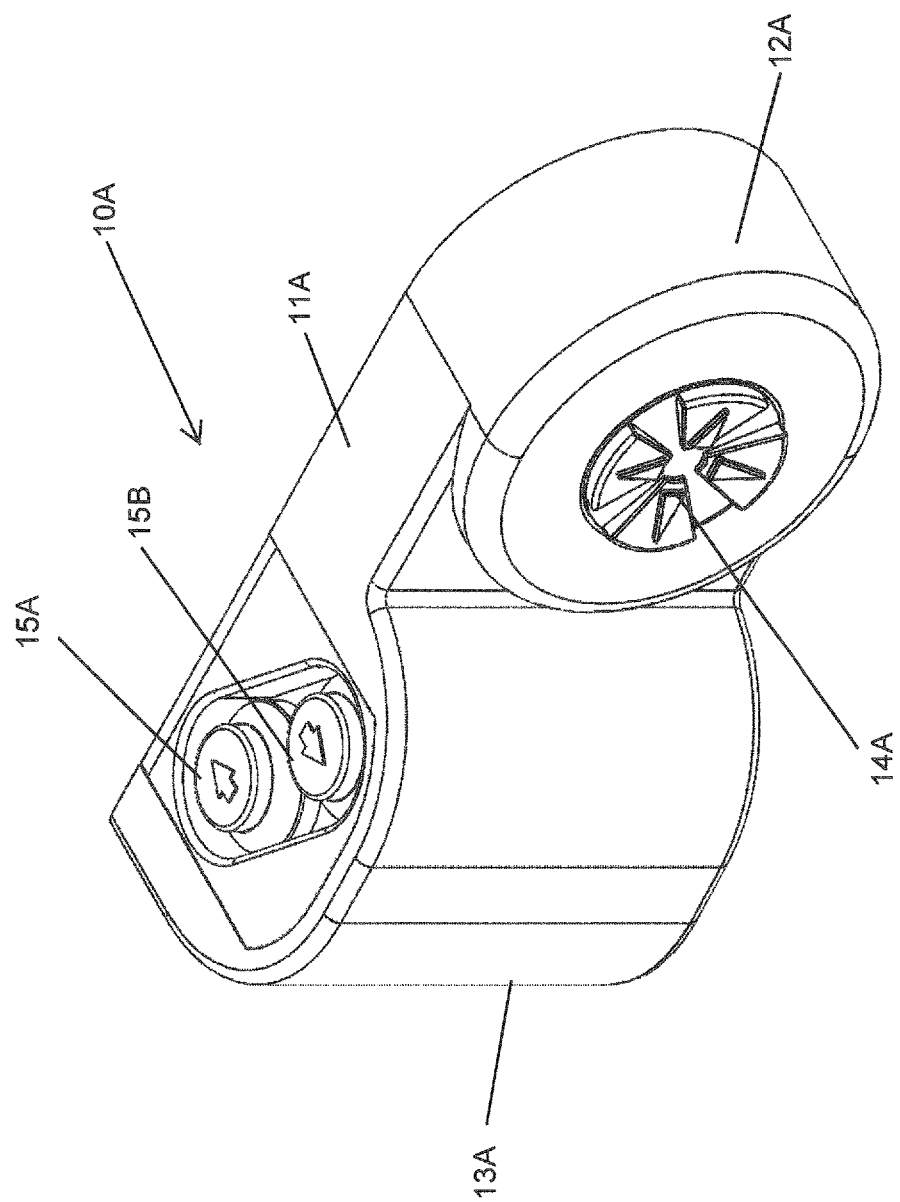

TRANSFER SEAT AND METHOD

CROSS REFERENCE TO RELATED APPLICATIONS

This application is a Continuation-In-Part of U.S. patent application Ser. No. 15/718,708, filed on 2017 Sep. 28, which is a division of U.S. patent application Ser. No. 14/899,250, now U.S. Pat. No. 9,783,081, which is the United States national phase of International Application No. PCT/US2014/044355 filed 2014 Jun. 26, which claims the benefit of U.S. Provisional Patent Application No. 61/839,635, filed on 2013 Jun. 26, the disclosures of which are incorporated herein by reference in their entirety.

BACKGROUND

Technical Field

The invention relates to a multi-way power transfer seat and operating controls for such a power transfer seat.

Discussion of Art

Six-way power transfer seats provide three movements for a person confined to a wheelchair to transfer from the wheelchair to a vehicle driver or passenger seat and subsequently to a forward position within the vehicle suitable for driving. In particular, such seats are capable of moving forward and rearward in the vehicle fore/aft direction, upward and downward, and rotationally about a vertical axis. The displacement of the transfer seat may be two to three times that available in an OEM operated seat base. A four-way power transfer seat is common and is produced by forgoing either the raise and lower function or the swivel function of the six-way power transfer seat, thereby creating a system that can be made available for less cost in applications where all three ranges of motion are not required.

Since their introduction in the early 1980's, nearly all transfer seats have been operated with a user control interface consisting of toggle switches; two switches for a four-way power transfer seat and three switches for a six-way power transfer seat. Early control designs featured two or three toggle switches arranged in a row atop a small box located approximately at the hip on the inboard side of the bucket seat. Without looking at the layout of the switches of such an arrangement, it was difficult to select the proper switch for the function desired. An improvement to the early design was to change the shape of the box so that the switches could be more directionally oriented.

Whether arranged in a straight line on a small box or directionally oriented, another concern of the operator is the inadvertent operation of a seat movement function while the vehicle is underway. Accordingly, further improvement involved the addition of a guard to minimize the potential for inadvertent operation. Such guards may serve to protect the switches during the transfer process but do not limit the movement of the switch.

Additionally, different vehicles employ different seat mounting systems. The current approach for mounting a power transfer seat within a vehicle requires that a different seat base (i.e., a separate SKU) be provided to accommodate every different vehicle. It may be desirable to have a system, apparatus or method that differs from those that are currently available.

BRIEF DESCRIPTION

In one embodiment, an operating control for a transfer seat is provided that includes rotation and direction control switches for a transfer seat. At least one rotation control switch is disposed on a first portion of a user control interface box body, the at least one rotation control switch may be actuated to control rotational movement of the transfer seat about an axis. At least one directional control switch may be disposed on a second portion of the user control interface box body, the directional control switch may be actuated to control forward and rearward movement of the transfer seat base and upward and downward movement of the transfer seat. During operation, a method may include monitoring a vehicle communication network for a BRAKE or PARK operating mode signal for a vehicle at a power transfer seat, and responding to a BRAKE or PARK operating mode signal by enabling one or more controls of the power transfer seat, otherwise disabling one or more controls of the power transfer seat. Further, an operating mode may be engaged by the rotation control switch to initiate movement of the power transfer seat about an axis. Further still, a directional control switch may be engaged to initiate at least one of a forward movement or rearward movement of a seat base of the power transfer seat, or an upward movement or downward movement of the transfer seat, or a combination of two or more of the foregoing movements simultaneously.

According to an embodiment, a power transfer seat operating control may include tactilely intuitive controls that save time and eliminate user frustration; switch protective elements that protect the various switches in the operating control from damage while the operator transfers to/from the wheelchair to/from the vehicle seat; and a Controller Area Network (CAN) based vehicle interlock that enhances operator safety by disabling the transfer seat controls when the vehicle transmission may be not in PARK or a brake may be not engaged.

According to an embodiment, a configurable assembly and mounting system is provided that may enable the same base unit to be installed in a variety of different vehicle applications. In particular, an improved seat base may be fitted with a configurable system of hooks and forks that enable a single base configuration to be used with a range of different vehicle specific application kits in order to facilitate application to a wide range of vehicles. The system may be configurable to provide the ability to assemble the same set of components for use in either the driver's or passenger's side application. The system may enable the equipment dealer to stock less material that may be applicable to a wider range of vehicles than competitive systems.

In accordance an embodiment of the invention, a power transfer seat base may include a top fixed plate, the top fixed plate having at least one fixed stop attached to an upper surface of the top fixed plate, a rotating plate mounted on the top fixed plate, the rotating plate having at least one rotating stop attached to a bottom surface of the rotating plate, and a user control interface box mounting bracket mounted on the rotating plate. The rotating plate may be rotatably mounted to the top fixed plate and configured so that the at least one rotating stop and the user control interface box mounting bracket may be connected to the rotating plate at different positions.

The at least one fixed stop attached to the upper surface of the top fixed plate may include at least two fixed stops attached to opposing sides of the upper surface of the top fixed plate. The at least one fixed stop attached to the upper surface of the top fixed plate may be configured to engage the at least one rotating stop attached to the bottom surface of the rotating plate to stop rotation of the rotating plate with respect to the top fixed plate in a direction of rotation. The at least one rotating stop and the user control interface box mounting bracket may be connected to the rotating plate on different sides of the rotating plate.

The power transfer seat base may include an operating control. The operating control includes a user control interface box body, at least one rotation control switch disposed on a first portion of the user control interface box body, the at least one rotation control switch configured to be actuated to control rotational movement of the power transfer seat about a vertical axis, and a directional control switch disposed on a second portion of the user control interface box body, the directional control switch configured to be actuated to control forward and rearward movement of the transfer seat base and upward and downward movement of the power transfer seat. The user control interface box body may be configurable for both driver and passenger side applications. The operating control may be mounted on the user control interface box mounting bracket. The first portion of the user control interface box body may include a forward half of the user control interface box body and the second portion of the user control interface box body may include a rearward half of the user control interface box body.

The power transfer seat base may include a mounting system for the power transfer seat base. The mounting system includes at least one removable cross member, the at least one removable cross member may attach to the power transfer seat base at different locations in a fore/aft direction, and at least one movable hook, the at least one movable hook configured to be attached to the power transfer seat base and the at least one removable cross member at different locations in a lateral direction. The at least one removable cross member may include at least two removable cross members. The mounting system may further include at least two attachment brackets disposed on the power transfer seat base. Each of the at least two attachment brackets may be connected to a respective one of the at least two removable cross members. Each of the at least two attachment brackets includes a plurality of adjustment holes defined therein and spaced apart in the fore/aft direction. Each of the at least two attachment brackets may be connected to the respective one of the at least two removable cross members by at least one fastener engaging the respective one of the at least two removable cross members and at least one of the plurality of adjustment holes of the attachment bracket.

The at least one movable hook may include at least two movable hooks. The at least one removable cross member may include at least two sets of adjustment holes defined therein at opposite ends of the at least one removable cross member. The adjustment holes of each set may be spaced apart in the lateral direction. Each of the at least two movable hooks may be connected to the at least one removable cross member by at least one fastener engaging the movable hook and at least one of the adjustment holes of the set of adjustment holes in the respective end of the at least one removable cross member. The mounting assembly may further include at least one movable fork configured to be attached to a rear of the power transfer seat base at different locations in the lateral direction.

In an embodiment of the invention, an operating control for a power transfer seat may be provided. The operating control includes a user control interface box body, at least one rotation control switch disposed on a first portion of the user control interface box body, the at least one rotation control switch configured to be actuated to control rotational movement of the power transfer seat about a vertical axis, and a directional control switch disposed on a second portion of the user control interface box body, the directional control switch configured to be actuated to control forward and rearward movement of the transfer seat base and upward and downward movement of the power transfer seat. The first portion of the user control interface box body may include a forward half of the user control interface box body and the second portion of the user control interface box body may include a rearward half of the user control interface box body. The user control interface box body may be configurable for both driver and passenger side applications. The forward half and the rearward half of the user control interface box body may be shaped differently to provide tactile feedback to a user when actuating the at least one rotation control switch or the directional control switch.

The at least one rotation control switch may include a knob attached to a top side of the user control interface box body, the knob being rotatable about a vertical axis. The user control interface box body may further include protrusions extending parallel to the vertical axis of the at least one rotation control switch to limit travel of the rotation control switch.

The directional control switch may include a joystick switch having a lever extending laterally from the user control interface box body, the lever being movable along a vertical direction and a horizontal fore/aft direction. The lever of the joystick switch may be spring loaded The user control interface box body may further include a protective housing for the lever of the joystick switch, the protective housing being configured to limit displacement of the lever of the joystick switch and protect the at least one rotation control switch from being damaged or inadvertently operated during a transfer event.

The operating control may further include a microcontroller in communication with the at least one rotation control switch and the directional control switch and with a controller area network of a vehicle, the microcontroller being configured to monitor the controller area network to detect the presence of a PARK signal transmitted over the controller area network and to disable operation of the operating control based on actuation of the at least one rotation control switch or the directional control switch when the PARK signal may be not present.

The at least one rotation control switch may include two push button switches, each push button switch being configured to be actuated to control movement of the power transfer seat in one direction of rotation about the vertical axis. The directional control switch may include a D-pad switch.

In an embodiment of the invention, a mounting system for a power transfer seat base may be provided. The mounting system includes at least one removable cross member, the at least one removable cross member being configured to be attached to the power transfer seat base at different locations in a fore/aft direction, and at least one movable hook, the at least one movable hook configured to be attached to the power transfer seat base and the at least one removable cross member at different locations in a lateral direction. The at least one removable cross member may include at least two removable cross members. The mounting system may further include at least two attachment brackets disposed on the power transfer seat base. Each of the at least two attachment brackets may be connected to a respective one of the at least two removable cross members. Each of the at least two attachment brackets includes a plurality of adjustment holes defined therein and spaced apart in the fore/aft direction. Each of the at least two attachment brackets may be connected to the respective one of the at least two removable cross members by at least one fastener engaging the respective one of the at least two removable cross members and at least one of the plurality of adjustment holes of the attachment bracket.

The at least one movable hook may include at least two movable hooks. The at least one removable cross member may include at least two sets of adjustment holes defined therein at opposite ends of the at least one removable cross member. The adjustment holes of each set may be spaced apart in the lateral direction. Each of the at least two removable hooks may be connected to the at least one removable cross member by at least one fastener engaging the movable hook and at least one of the adjustment holes of the set of adjustment holes in the respective end of the at least one removable cross member. The mounting assembly may further include at least one movable fork configured to be attached to a rear of the power transfer seat base at different locations in the lateral direction. The mounting system may include a vehicle specific installation kit.

In an embodiment of the invention, a method of assembling a power transfer seat base includes providing a power transfer seat base that includes a top fixed plate, at least one fixed stop connected to an upper surface of the top fixed plate, a rotating plate, at least one rotating stop configured to be attached to a bottom surface of the rotating plate, a user control interface box mounting bracket configured to be mounted on the rotating plate, and a mounting system for the power transfer seat base, the mounting system including at least one removable cross member and at least one movable hook or fastener. The method includes selecting one of a right side configuration and a left side configuration for the power transfer seat base, attaching the at least one rotating stop to a side of the bottom surface of the rotating plate based on the selection of one of the right side configuration and the left side configuration, mounting the user control interface box mounting bracket on a side of the rotating plate based on the selection of one of the right side configuration and the left side configuration, rotatably mounting the rotating plate to the top fixed plate, selecting a position of the power transfer seat base and the at least one removable cross member with respect to the at least one movable hook in a lateral direction, attaching the at least one movable hook to the power transfer seat base and the at least one removable cross member based on the selected position in the lateral direction, selecting a position of the power transfer seat base with respect to the at least one removable cross member in a fore/aft direction, and attaching the at least one movable cross member to the power transfer seat base based on the selected position in the fore/aft direction.

These and other features and characteristics of the invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It may be to be expressly understood, however, that the drawings may be for the purpose of illustration and description only, and may be not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 1A depicts a perspective view of an operating control for a six-way power transfer seat in accordance with another embodiment of the invention;

DETAILED DESCRIPTION OF THE INVENTION

In one embodiment, an operating control for a transfer seat is provided that includes rotation and direction control switches for a transfer seat. At least one rotation control switch is disposed on a first portion of a user control interface box body, the at least one rotation control switch may be actuated to control rotational movement of the transfer seat about an axis. At least one directional control switch may be disposed on a second portion of the user control interface box body, the directional control switch may be actuated to control forward and rearward movement of the transfer seat base and upward and downward movement of the transfer seat. During operation, a method may include monitoring a vehicle communication network for a BRAKE or PARK operating mode signal for a vehicle at a power transfer seat, and responding to a BRAKE or PARK operating mode signal by enabling one or more controls of the power transfer seat, otherwise disabling one or more controls of the power transfer seat. Further, an operating mode may be engaged by the rotation control switch to initiate movement of the power transfer seat about an axis. Further still, a directional control switch may be engaged to initiate at least one of a forward movement or rearward movement of a seat base of the power transfer seat, or an upward movement or downward movement of the transfer seat, or a combination of two or more of the foregoing movements simultaneously.

Figure 1:
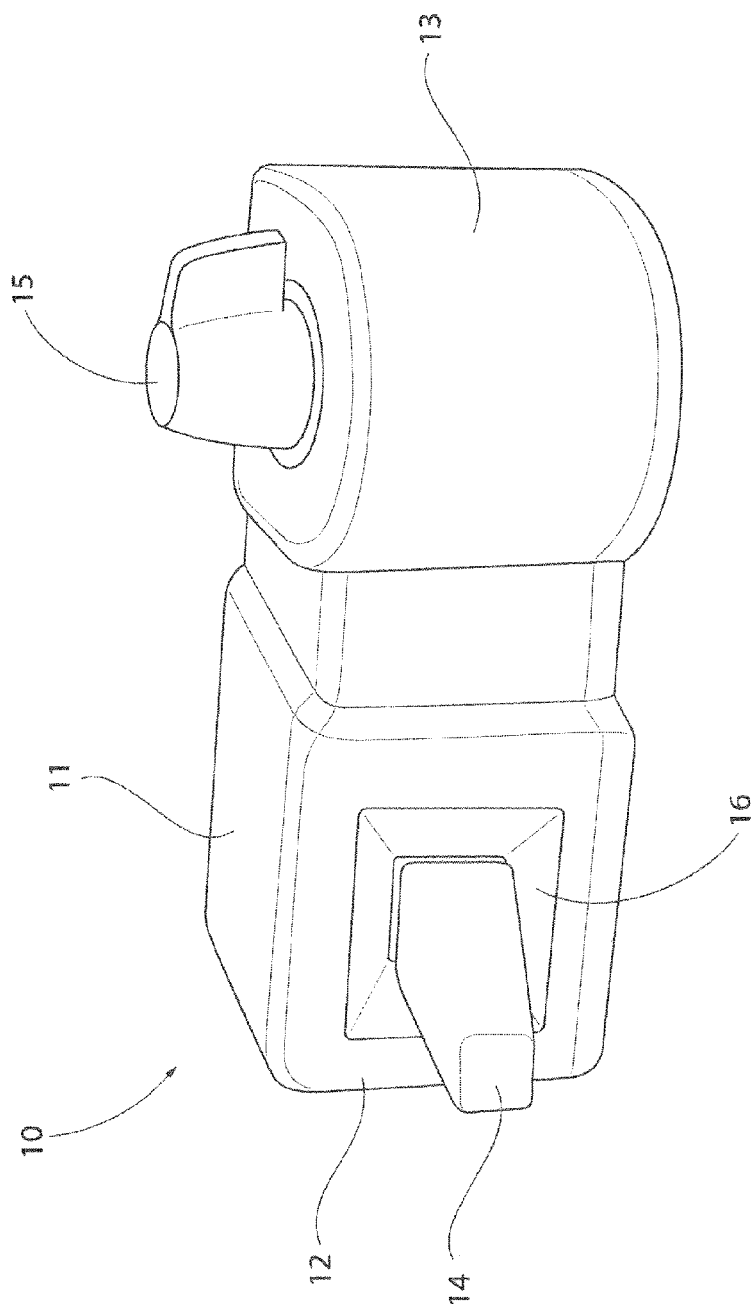
FIG. 1 depicts a perspective view of an operating control for a six-way power transfer seat in accordance with an embodiment of the invention.
Figure 2:
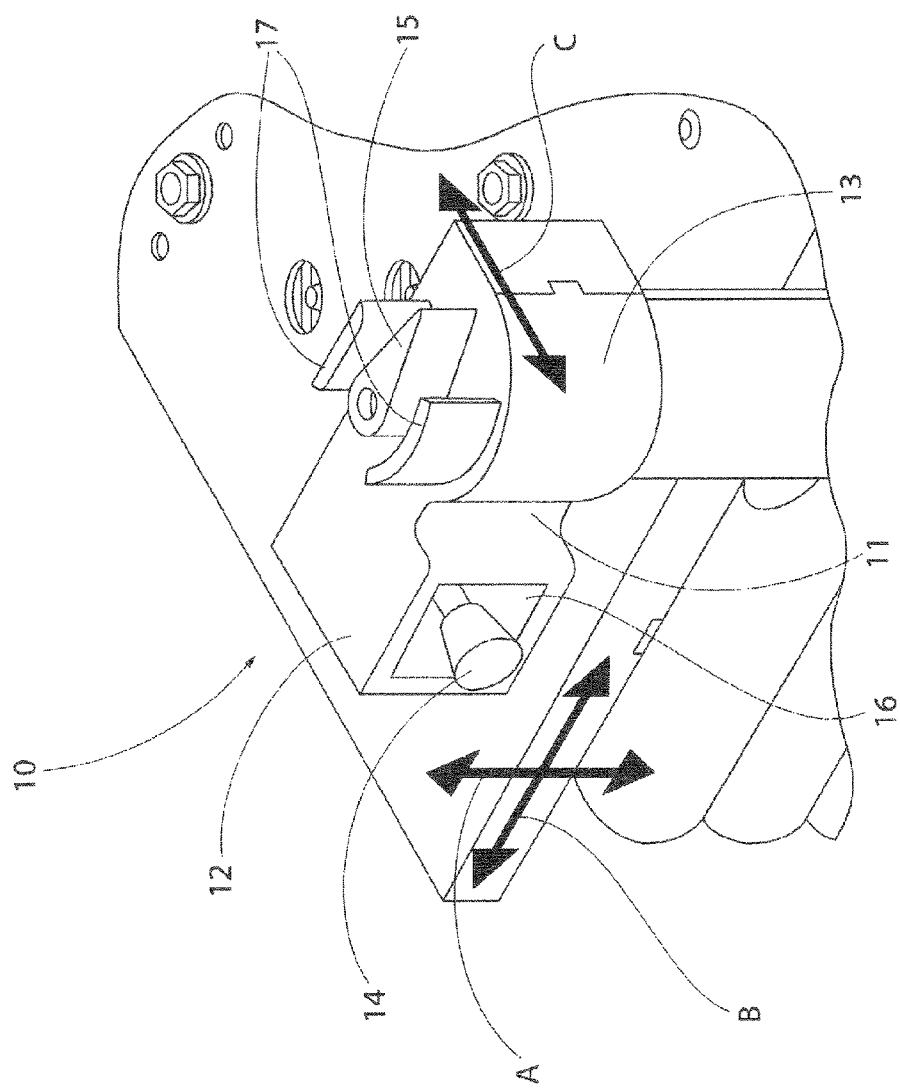
FIG. 2 depicts a schematic view demonstrating the actuation and protective elements of the operating control of FIG. 1.

With reference to FIGS. 1 and 2, an operating control for a six-way power transfer seat may be shown in accordance with an embodiment of the invention. The operating control includes a user control interface box 10 having a user control interface box body 11, which provides a user interface for controlling movement of the power transfer seat. The user control interface box body 11 may be divided into a first portion including the forward half 13 of the body 11 and a second portion including the rearward half 12 of the body 11. The rearward half 12 of the user control interface box body 11 includes a directional control switch 14. As shown, the directional control switch 14 includes a joystick switch having a lever located on the side of the user control interface box body 11 and extending laterally from the user control interface box body 11. The lever may be movable along a vertical direction as indicated by the arrow "A"

shown in FIG. 2 and a horizontal fore/aft direction as indicated by the arrow B shown in FIG. 2. The joystick switch 14 may be actuated to control both the forward and rearward movement and the upward and downward movement functions of the power transfer seat. Moving the lever of the joystick switch 14 forward makes the base of the seat move forward, moving the lever up makes the base go up, and so on. The forward half 13 of the user control interface box body 11 includes at least one rotation control switch 15, which includes a knob attached to a top side of the user control interface box body 11 and rotatable about a vertical axis as indicated by the arrow C shown in FIG. 2. The at least one rotation control switch 15 may be actuated to control rotational movement of the power transfer seat about a vertical axis. Rotating the knob of the at least one rotation control switch 15 clockwise makes the seat rotate clockwise and vice versa. In an embodiment, the joystick switch 14 may be located on a first portion of the user control interface box body 11, and the at least one rotation control switch 15 may be located on a second, different portion of the user control interface box body 11. Further, the joystick switch 14 and/or the rotation control switch 15 can be configured to be actuated to control any specified movement of the power transfer seat, including, but not limited to, forward movement, rearward movement, upward movement, downward movement, rotation movement about a vertical axis, rotation movement about a horizontal axis, and/or any other desired movement of the power transfer seat.

In an embodiment, the shapes of the rearward and forward halves 12, 13 (or different portions) of the user control interface box body 11 may be shaped differently in order to provide the user with further tactile information when the user reaches for the joystick and rotation control switches 14, 15. The combination of the laterally oriented joystick switch 14 and the rotation control switch 15 makes an arrangement that may be more tactilely intuitive than previous iterations. Moreover, as the joystick switch 14 controls both forward and rearward and upward and downward movement, the number of choices that the user has to make in engaging a switch has been limited, thereby making it nearly impossible for the user to pick the wrong switch.

Because the user interface provided by the operating control may be simpler to operate, it may be more susceptible to inadvertent operation. In order to mitigate this eventuality, and in an embodiment, one or more protective elements may be provided on the user control interface box body 11 to prevent or limit inadvertent operation. As shown in FIG. 2, at least one (or in other embodiments, multiple) protrusions 17 may be mounted parallel to the axis of the knob of the at least one rotation control switch 15 that serve the dual purpose of limiting the travel of the rotation control switch 15, thereby preventing the overloading of the switch by the operator, and protecting the rotation control switch 15 from damage while the operator may be moving from the wheelchair to the vehicle driver's seat. Further, such protrusions 17 may be shaped or contoured to be comfortably contacted or gripped by the user, while still providing access to the rotation control switch 15. In addition, protrusions or other protective elements may be located on or near the joystick switch 14 to provide similar protection.

In an embodiment, the lever or bat of the joystick switch 14 may be spring loaded such that, in the event a blow may be taken by the joystick switch 14 along the axis of the lever, the joystick switch 14 can compress into a protective housing 16 formed in the rearward half 12 of the user control interface box body 11. Additionally, the surrounding protective housing 16 of the joystick switch 14 may be spaced such that, in the event the joystick switch 14 may be displaced in any direction, it can only move just past the actuation point of the joystick switch 14 before contact may be made between the lever of the joystick switch 14 and the protective housing 16, thereby protecting the joystick switch 14 from damage when the operator may be moving from the wheelchair to the vehicle driver's seat.

With reference to FIG. 1A, an operating control for a six-way power transfer seat may be shown in accordance with another embodiment of the invention. The operating control illustrated in FIG. 1A operates according to the same principles as the operating control described above with reference to FIGS. 1 and 2, but provides a different configuration of controls. In particular, the operating control includes a user control interface box 10A having a user control interface box body 11A, which provides a user interface for controlling movement of a power transfer seat. The user control interface box body 11A may be divided into a first portion including the forward half 13A of the body 11A and a second portion including the rearward half 12A of the body 11A. The rearward half 12A of the user control interface box body 11A includes a directional control switch 14A in the form of a D-pad switch. As shown, the D-pad switch 14A includes a segmented button or, alternatively, multiple buttons, which is/are arranged so that pressing on/actuation of a particular portion of the button or on an individual button controls the power transfer seat to move in a direction corresponding to the position of the portion of the button or individual button being pressed/actuated. Accordingly, pressing or actuating the upper portion of the D-pad switch 14A causes the power transfer seat to move upward, pressing or actuating the lower portion of the D-pad switch 14A causes the power transfer seat to move downward, pressing or actuating the forward portion of the D-pad switch 14A causes the power transfer seat to move forward, and pressing or actuating the rearward portion of the D-pad switch 14A causes the power transfer seat to move rearward. In this manner, the D-pad switch 14A may be actuated to control both the forward and rearward movement and the upward and downward movement functions of the power transfer seat. The forward half 13A of the user control interface box body 11A includes at least one rotation control switch, which includes two push button switches 15A, 15B. Each push button switch 15A, 15B may be configured to be actuated to control movement of the power transfer seat in one direction of rotation about the vertical axis. Pressing or actuating the push button switch 15A with the right pointing arrow causes the power transfer seat to rotate clockwise about the vertical axis, and pressing or actuating the push button switch 15B with the left pointing arrow causes the power transfer seat to rotate counterclockwise about the vertical axis. The D-pad switch 14A and/or the push button rotation control switches 15A, 15B can be configured to be actuated to control any specified movement of the power transfer seat, including, but not limited to, forward movement, rearward movement, upward movement, downward movement, rotation movement about a vertical axis, rotation movement about a horizontal axis, and/or any other desired movement of the power transfer seat. As in the embodiment of the operating control discussed above with reference to FIGS. 1 and 2, the rearward and forward halves 12A, 13A of the user control interface box body 11A may be shaped differently to provide the user with further tactile information when the user reaches to press the D-pad switch 14A and/or the push button rotation control switches 15A, 15B. The user control interface box body 11A may include one or more protective elements provided to protect the D-pad switch 14A and the push button rotation control switches 15A, 15B from inadvertent operation and damage. For instance, as shown in FIG. 1A, the push button rotation control switches 15A, 15B may be recessed within the user control interface box body 11A.

With respect to both of the embodiment of FIGS. 1 and 2, and the embodiment of FIG. 1A, that the user control interface box body 11, 11A may be configurable for both driver and passenger side applications. In other words, the at least one rotation control switch 15, 15A, 15B may be moved from one side of the user control interface box body 11, 11A to the other and the jumpers of the directional control switch 14, 14A may be swapped so that the user control interface box 10, 10A may be positioned on either one of the left side or the right side of the power transfer seat base.

Figure 3:
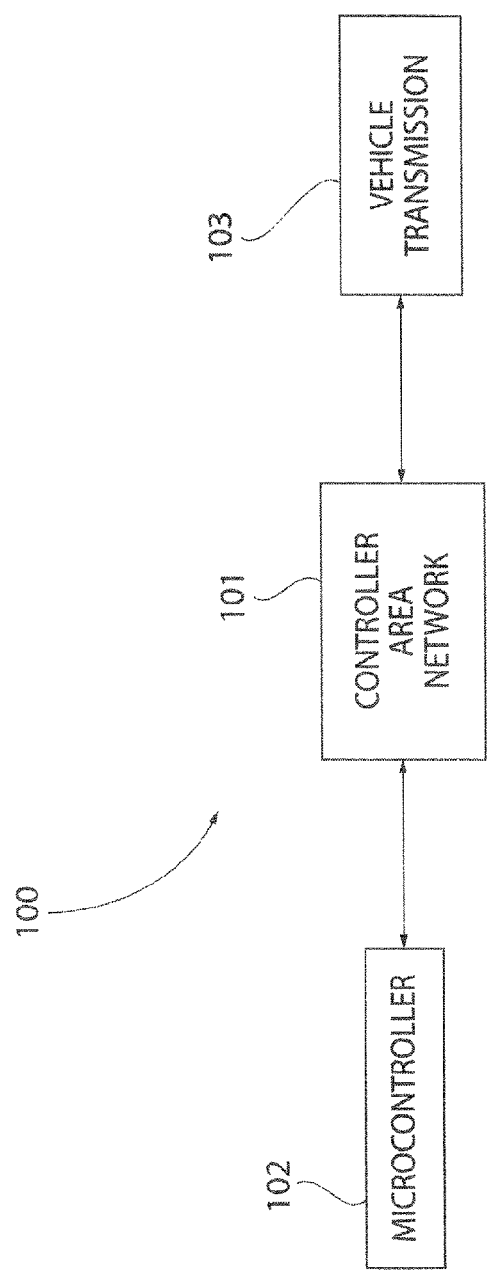
FIG. 3 depicts a schematic of a CAN-based vehicle interlock system in accordance with another embodiment of the invention.
Figure 4:
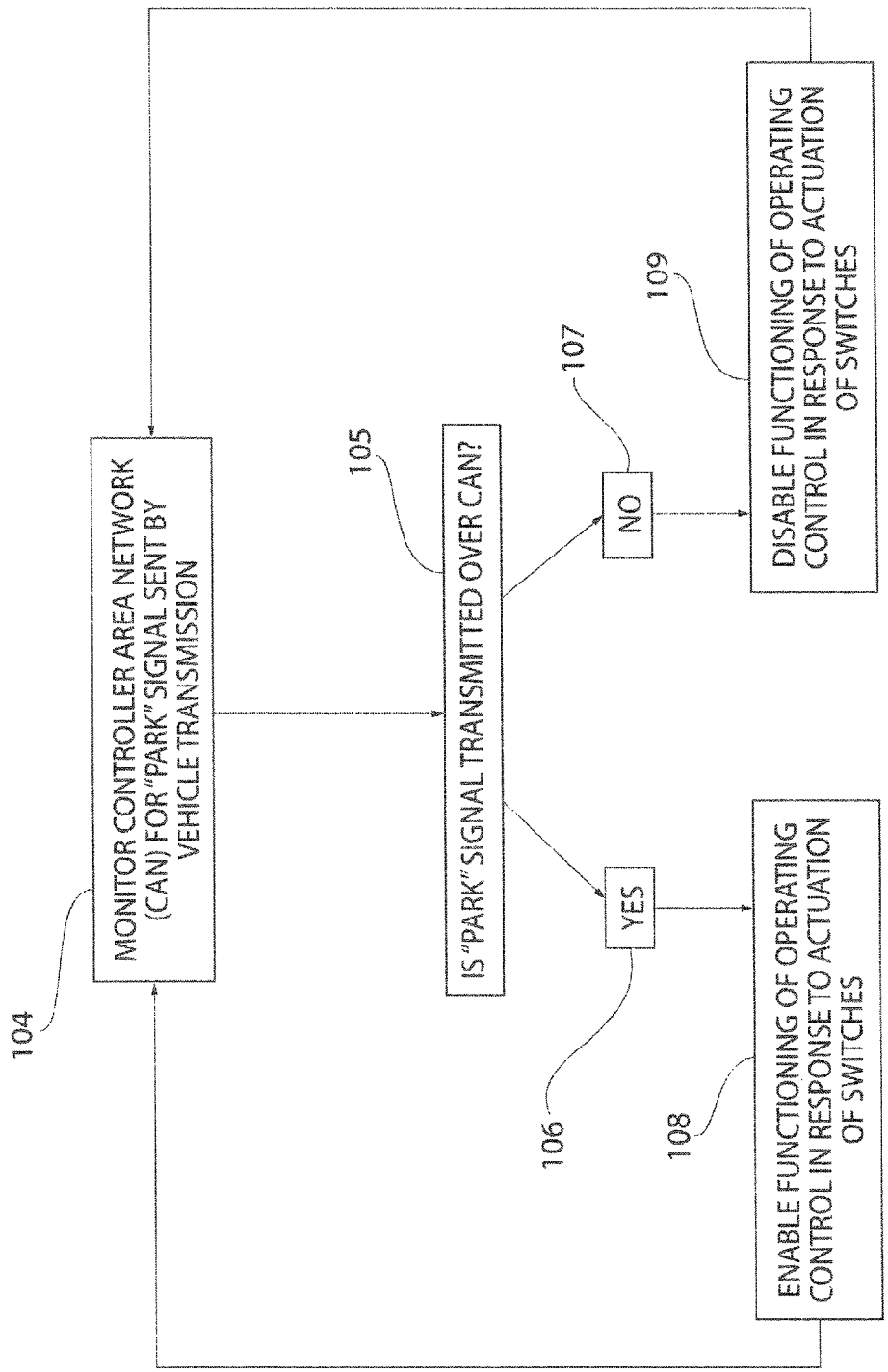
FIG. 4 depicts a schematic of an interlock process performed by the CAN-based vehicle interlock system of FIG. 3.

With reference to FIGS. 3 and 4, according to an embodiment of the invention, the operating control may be provided with a CAN-based vehicle interlock system 100 that disables the operating control when the vehicle may be in motion. Modern automotive control systems may be based on a series of vehicle mounted computer systems. These computers communicate with each other over a network referred to as a Controller Area Network (CAN) 101. CAN may be a vehicle communications bus standard designed to allow microcontrollers and devices to communicate with each other within a vehicle without a host computer. CAN bus may be a message-based protocol designed for internal communication in automotive and vehicle applications.

The operating control of the transfer seat may communicate with, or be interlocked with, the vehicle so that the transfer seat controls may disable when the vehicle is not parked. To accomplish the vehicle interlock, and an embodiment, the operating control may be provided with a microcontroller 102 capable of monitoring signals moving across the vehicle CAN 101, which may be transmitted over the CAN by a vehicle transmission 103 or any other component of the CAN 101. By monitoring the CAN 101 for the absence of the vehicle's "BRAKE" or "PARK" signal, the microcontroller 102 provides a signal to the operating control that disables the transfer seat controls. The microcontroller 102 may communicate with the at least one rotation control switch 15 and the directional control switch 14 of the operating control. The microcontroller 102 monitors the CAN 101 to detect the presence of a "BRAKE" or "PARK" signal transmitted over the CAN 101 by the vehicle transmission 103 or other vehicle component in communication with the CAN 101. When the "BRAKE" or "PARK" signal is not present over the CAN 101, the microcontroller disables operation of the operating control based on actuation of the at least one rotation control switch or the directional control switch. In one embodiment, other CAN bus signals are monitored and if movement of the vehicle is detected via the CAN bus signals the microcontroller disables operation of the transfer seat and, optionally, moves the transfer seat into a safe position.

FIG. 4 illustrates a schematic of the interlock process performed by the CAN-based interlock system 100, particularly the microcontroller, to engage or disengage the interlock to disable or enable operating of the operating control, in accordance with another embodiment of the invention. In an initial step 104, the microcontroller monitors the CAN 101 for the presence of the "PARK" or equivalent signal. In a following step 105, the microcontroller determines whether the "PARK" signal may be transmitted over the CAN 101. If the microcontroller determines that the "PARK" signal may be transmitted over the CAN 101, as indicated by step 106, the microcontroller proceeds to step 108 to enable functioning of the operating control in response to actuation of the at least one rotation control switch 15 and/or the directional control switch 14. The process then returns to the initial monitoring step 104. If the microcontroller determines that the "PARK" signal may be not transmitted over the CAN 101, as indicated by step 107, the microcontroller proceeds to step 109 to disable functioning of the operating control in response to actuation of the at least one rotation control switch 15 and/or the directional control switch 14. The process then returns to the initial monitoring step 104. In an alternative embodiment, the microcontroller commands the vehicle to "PARK" and/or to not move while the power transfer seat is in operation or in response to determined activities of the power transfer seat.

With reference to FIGS. 5-8, a configurable power transfer seat base 20 may be shown in accordance with an embodiment of the invention. Given that it may be desired to install the seat base 20 in either the driver's or front passenger's positions, the power transfer seat base may be designed to permit the rotate function and the mounting of the user control interface box body to be field-configurable. The transfer seat base may be installed in the driver's position (on the left-hand side of the vehicle) and may rotate clockwise (as oriented from above the seat looking down) away from the driver's position and back again. In the event the seat may be to be moved to the passenger side (on the right-hand side of the vehicle), the power transfer seat base 20 must be reconfigured to rotate in the opposite direction.

Figure 5:
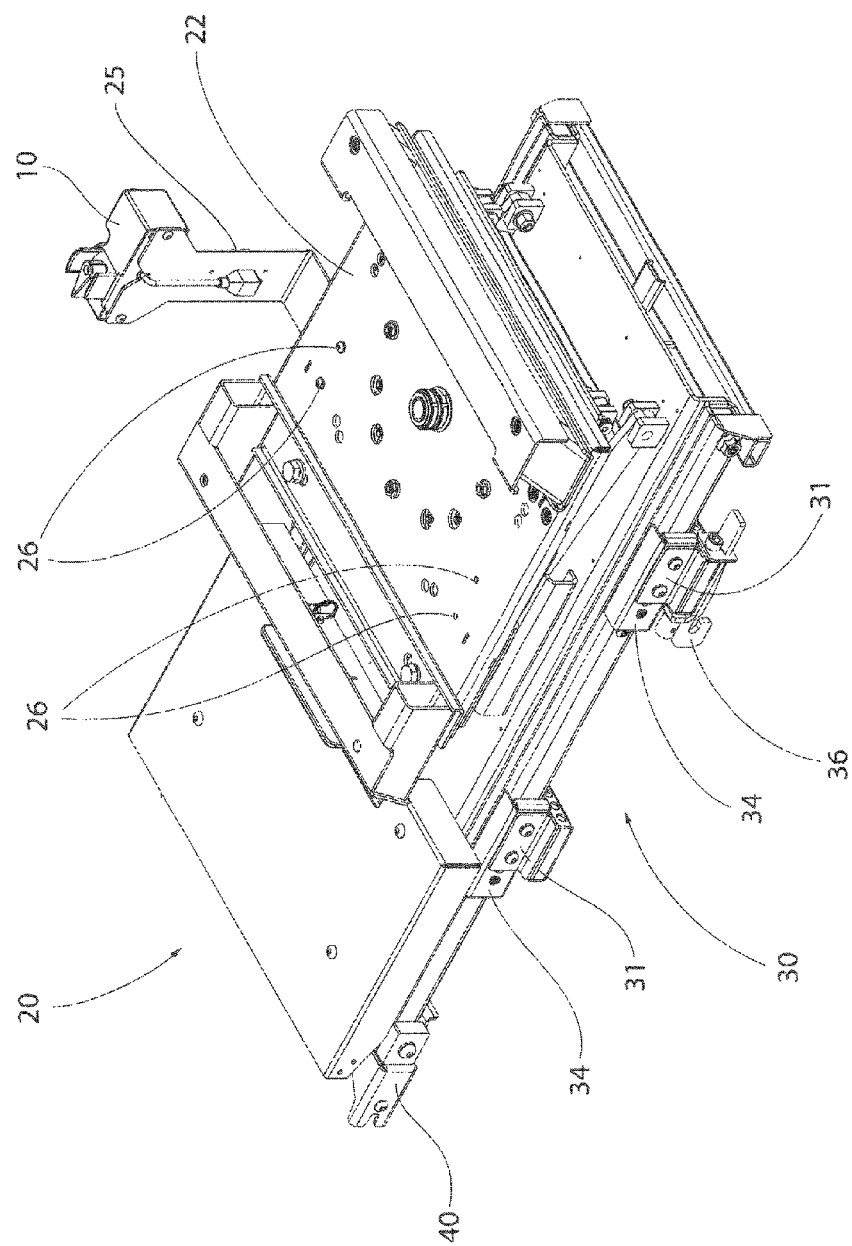
FIG. 5 depicts a perspective view of a power transfer seat base for a six-way power transfer seat in accordance with another embodiment of the invention.
Figure 6:
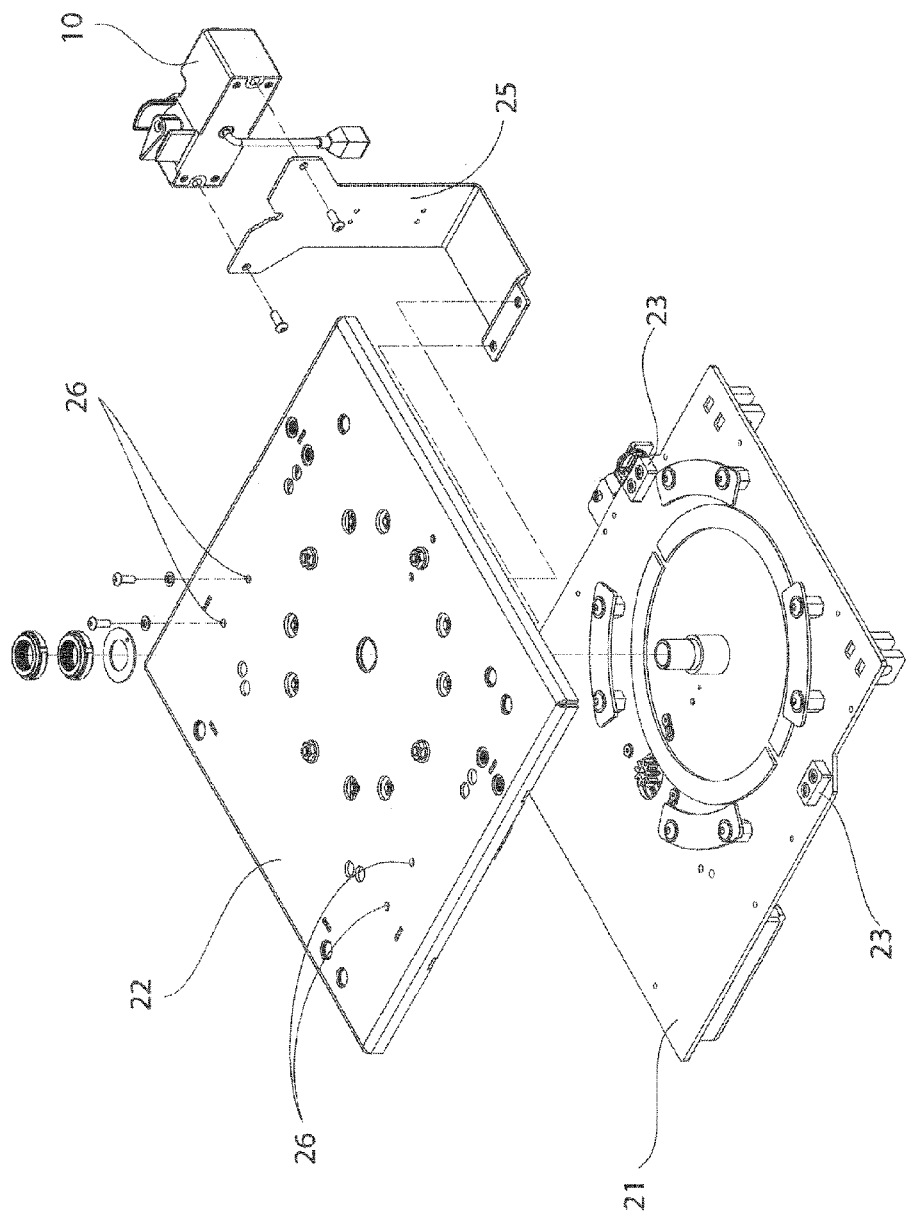
FIG. 6 depicts an exploded perspective view of a portion of the power transfer seat base of FIG. 5.
Figure 7:
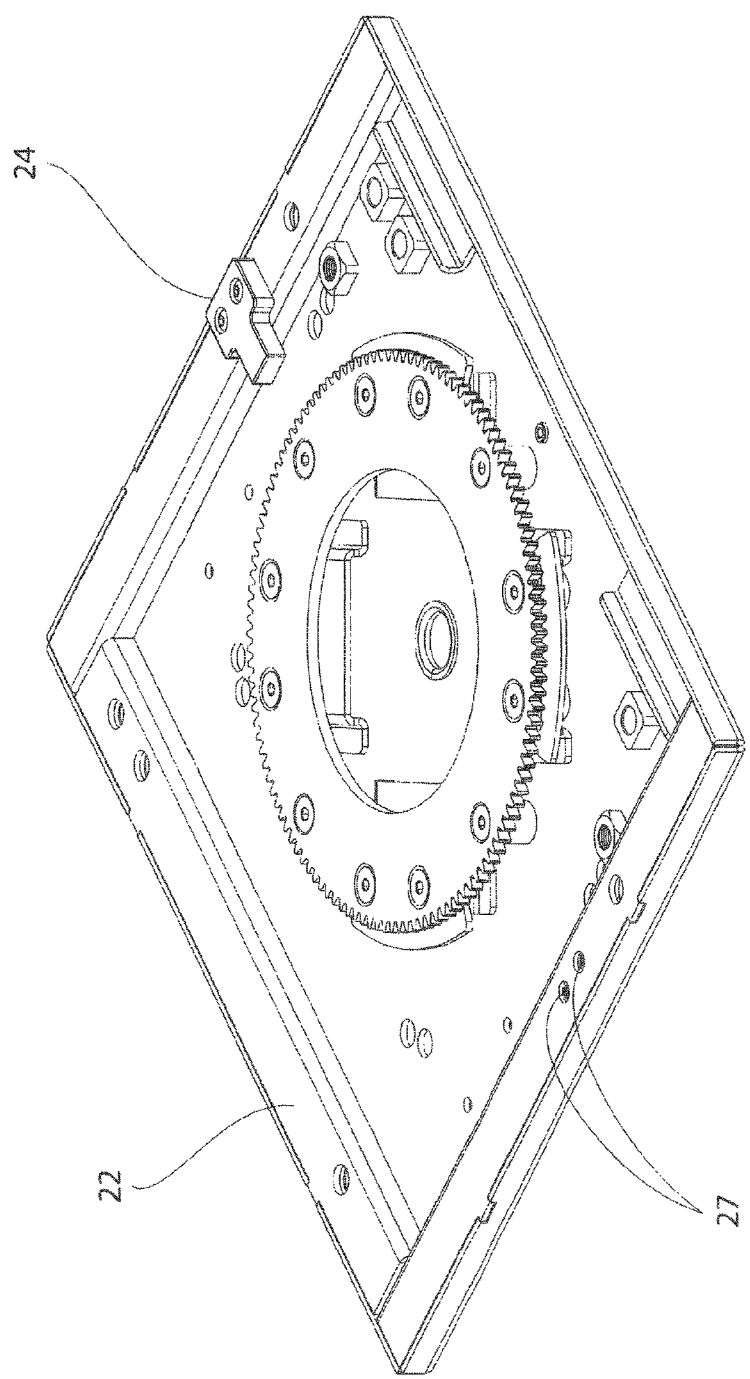
FIG. 7 depicts a perspective view of a bottom surface of a rotating plate of the power transfer seat base of FIG. 5.

As shown in FIGS. 5-7, the power transfer seat base includes, amongst other components, a top fixed plate 21, a rotating plate 22 rotatably mounted above the top fixed plate 21, and a user control interface box mounting bracket 25 for mounting the user control interface box 10 to the power transfer seat base. The rotating plate may be configured so that the user control interface box mounting bracket 25 and at least one rotating stop 24 may be connected to the rotating plate at different positions. The rotating plate may be provided with mounting holes 26 on both lateral sides thereof for attachment of the mounting bracket 25, and, thus, the user control interface box mounted on the user control interface box mounting bracket 25, to the rotating plate. At least one fixed stops 23 may be attached on an upper surface of the top fixed plate 21 and the at least one rotating stop 24 may be fastened to a bottom surface of the rotating plate where the rotating plate engages the top fixed plate. The rotating plate may be provided with mounting holes 27 formed on opposing lateral sides of the bottom surface thereof for attachment of the rotating stop to the rotating plate. The fixed stops on the top fixed plate may engage the rotating stop on the rotating plate to stop rotation of the rotating plate with respect to the top fixed plate in a given direction of rotation. Accordingly, providing two fixed stops on the upper surface of the top fixed plate, as shown in FIG. 6, and one rotating stop on the bottom surface of the rotating plate, as shown in FIG. 7, limits rotational movement of the rotating plate, and, thus, the power transfer seat, between a position in which the power transfer seat faces in the forward direction of the vehicle and a position in which the power transfer seat may be oriented laterally to allow for entry and exit of the vehicle.

The seat base may be reconfigured to change the direction of rotation by moving the rotating stop from one lateral side of the rotating plate to the other, as shown in FIG. 7; moving the user control interface box mounting bracket from one lateral side of the rotating plate to the other side; and moving the user control interface box by inverting the rotation control switch and changing a jumper on the joystick switch to maintain the correct orientation of the raise/lower function. Of course, it may be envisioned that the fixed stops and/or the rotating stops may be positioned to allow the seat to be moved to any desirable position within or in connection with the vehicle. In addition, the mounting bracket may be used in a variety of applications and may suit a particular user. As such, the mounting bracket may be adjustable, rotatable, removably detachable, or any other configuration to allow for the adjustment and/or movement of the mounting bracket and/or the user control interface box.

Figure 8:
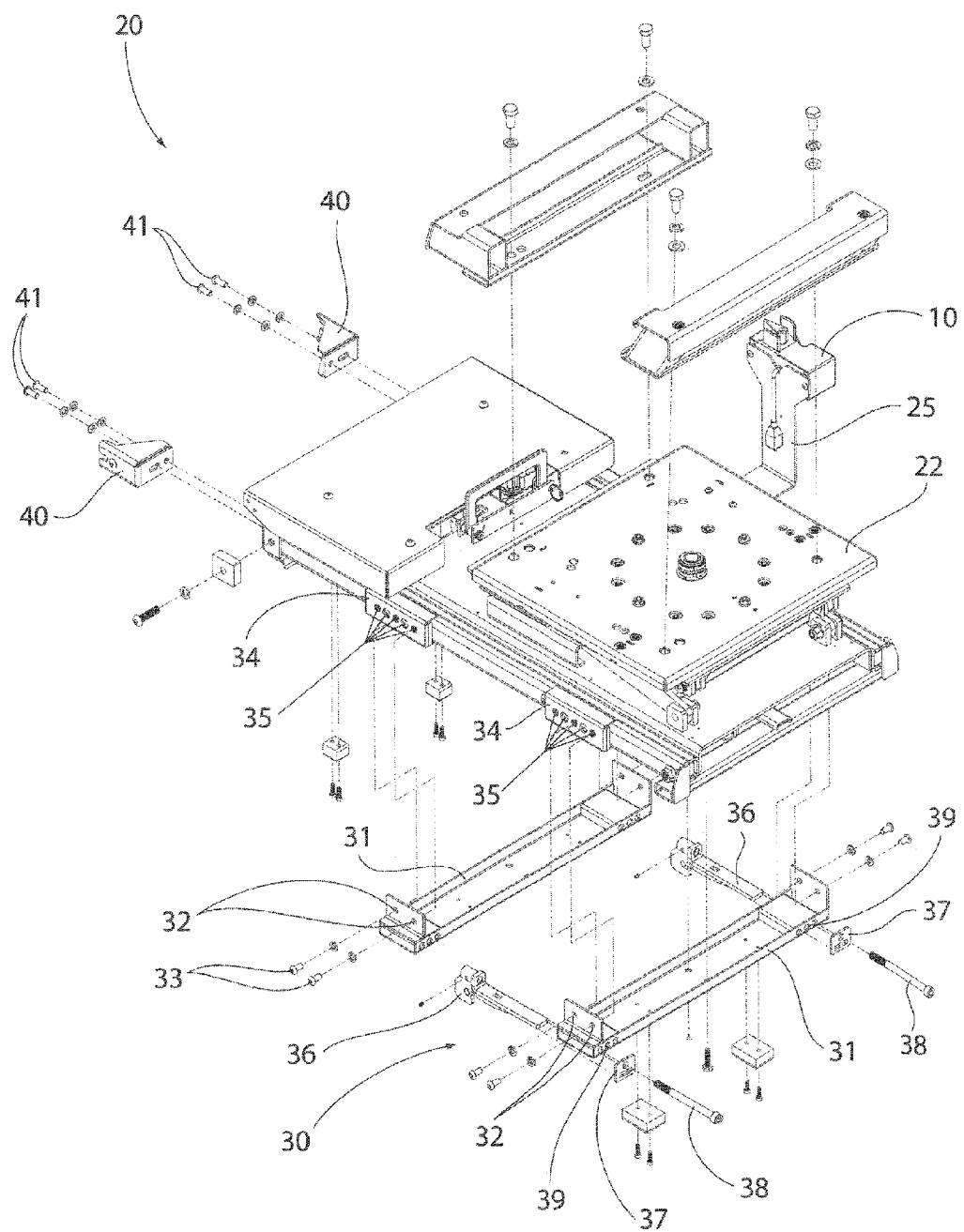
FIG. 8 depicts an exploded perspective view of the power transfer seat base of FIG. 5.

As shown in FIGS. 5 and 8, the seat base includes a mounting system 30 for the power transfer seat base, which may be shown in accordance with an embodiment of the invention. Various alternative embodiments of the mounting system may be installed in a variety of vehicles. In one embodiment, the mounting system is selectively configurable and includes at least one removable cross members 31 that accommodate variation in the mounting position of the base in the fore/aft direction of the vehicle by being connectable to attachment brackets 34 provided on the seat base at multiple positions. The mounting system includes at least one movable hook 36 that accommodate variation in the mounting position of the base in the lateral (e.g., right/left direction) by connecting the removable cross members 31 and/or the power transfer seat base to the vehicle in a manner that allows for different side-to-side spacing. The mounting system may include at least one movable fork 40 that cooperates with the a corresponding one of the movable hooks to mount the seat base to the vehicle in a manner that accommodates variation in the mounting position of the base in the lateral direction. The movable hook is a species of fastener. In other embodiments, fasteners that are not hooks may be selected based on application specific criteria.

One or more removable cross member 31 may connect to the power transfer seat base at different locations in the fore/aft direction and the movable hooks may be attached to the power transfer seat base and at least one of the removable cross members at different locations in the lateral direction. The mounting system includes the attachment brackets disposed on the power transfer seat base. Each of the attachment brackets may connect to a respective one of the removable cross members. According to one embodiment, two attachment brackets, one bracket 34 provided on each lateral side of the base, may be provided for connection to each of the removable cross members provided. Thus, in the embodiment illustrated in FIG. 5, the mounting system 30 may be provided with two removable cross members spaced apart in the fore/aft direction and four corresponding attachment brackets. Each of the attachment brackets includes a plurality of adjustment holes 35 defined therein, which may be spaced apart in the fore/aft direction. Each of the attachment brackets may be connected to the respective one of the removable cross members by at least one fastener 33 engaging holes 32 formed in a portion of the respective removable cross member and at least one of the plurality of adjustment holes 35 formed in the attachment bracket 34. In this manner, the position of the power transfer seat base with respect to the removable cross members in the fore/aft direction may be adjusted or configured by selecting which of the plurality of adjustment holes 35 of the attachment brackets may be engaged with the fasteners 33 to connect the removable cross members to the power transfer seat base.

At least one of the removable cross members may include at least two sets of adjustment holes 39 defined therein at opposite lateral ends of the removable cross member, which extend through the removable cross member. The adjustment holes 39 of each set may be spaced apart in the lateral direction. Each of the movable hooks may be connected to a respective one of the removable cross members by at least one fastener engaging the movable hook and at least one of the adjustment holes in the set of adjustment holes in the respective end of the removable cross member. As shown in FIG. 8, the fastener may be a bolt that engages the movable hook 36, passes through the selected attachment hole 39 in the removable cross member, and then engages an attachment plate 37 that may be slid over an end of the movable hook 36 to rigidly connect the movable hook 36 to the removable cross member. In this manner, the position of the removable cross members, and, thus, the power transfer seat base, in the lateral direction may be adjusted or configured by selecting which of the plurality of adjustment holes of the removable cross member may be to be engaged with the bolts 38 to connect the removable cross member to the movable hooks. As discussed above, the mounting system 30 may include at least one movable forks 40 that may be configured to be attached by fasteners 41 to a rear of the power transfer seat base at different locations in the lateral direction.

The movable hooks, movable forks 40, and/or the removable cross members may be connected, directly or indirectly, to existing mooring points built in the vehicle floor. Since different vehicles may be likely to have different types and configurations of mooring points, prior art mounting systems for power transfer seats had to be individually configured for a variety of different vehicle configurations. The mounting system 30 of the invention may avoid the necessity of providing differently configured mounting systems for a variety of vehicles by making the connections between the elements of the mounting system 30 and the power seat transfer base adjustable and configurable. Alternatively, the mounting system 30 may include a vehicle specific installation kit.

With reference to FIGS. 5-8, according to an embodiment of the invention, a method of assembling a power transfer seat base may be provided. The method includes providing a power transfer seat base having a top fixed plate, at least one fixed stop 23 connected to an upper surface of the top fixed plate, a rotating plate, at least one rotating stop 24 connected to a bottom surface of the rotating plate, a user control interface box mounting bracket 25 configured to be mounted on the rotating plate, and a mounting system 30 for the power transfer seat base, which includes at least one removable cross member and at least one movable hook 36. The method further includes selecting one of a right side configuration and a left side configuration for the power transfer seat base, attaching the at least one rotating stop 24 to a side of the bottom surface of the rotating plate based on the selection of one of the right side configuration and the left side configuration, mounting the user control interface box mounting bracket on a side of the rotating plate based on the selection of one of the right side configuration and the left side configuration, rotatably mounting the rotating plate to the top fixed plate, selecting a position of the power transfer seat base and the at least one removable cross member with respect to the at least one movable hook in a lateral direction, attaching the at least one movable hook to the power transfer seat base and the at least one removable cross member based on the selected position in the lateral direction, selecting a position of the power transfer seat base with respect to the at least one removable cross member in a fore/aft direction, and attaching the at least one removable cross member to the power transfer seat base based on the selected position in the fore/aft direction.

For purposes of the description hereinafter, the terms "end", "upper", "lower", "right", "left", "vertical", "horizontal", "top", "bottom", "lateral", "longitudinal", "fore/aft", and derivatives thereof shall relate to the invention as it may be oriented in the drawing figures. However, it may be to be understood that the invention may assume various alternative variations and step sequences, except where expressly specified to the contrary. It may be to be understood that the specific devices and processes illustrated in the attached drawings, and described in the following specification, may be simply exemplary embodiments of the invention. Hence, specific dimensions and other physical characteristics related to the embodiments disclosed herein may be not to be considered as limiting. Embodiments of the invention may assume various alternative variations and step sequences, except where expressly specified to the contrary. The specific devices and processes illustrated in the attached drawings, and described in the specification, may be exemplary embodiments of the invention. Although the invention has been described in detail for the purpose of illustration based on what may be currently considered to be functional embodiments, such detail may be solely for that purpose and that the invention may be not limited to the disclosed embodiments but covers modifications and equivalent arrangements that may be within the scope thereof. For example, the invention contemplates that, to the extent possible, one or more features of any embodiment can be combined with one or more features of any other embodiment.

The invention claimed is:

1. An operating control for a transfer seat, the operating control comprising:
    at least one rotation control switch disposed on a first portion of a user control interface box body, the at least one rotation control switch configured to be actuated to control rotational movement of the transfer seat about an axis; and
    a directional control switch disposed on a second portion of the user control interface box body, the directional control switch configured to be actuated to control forward and rearward movement of the transfer seat base and upward and downward movement of the transfer seat,
    wherein the first portion of the user control interface box body comprises a forward half of the user control interface box body and the second portion of the user control interface box body comprises a rearward half of the user control interface box body, and
    the user control interface box body is configurable for both driver and passenger side applications,
    wherein the forward half and the rearward half of the user control interface box body are shaped differently to provide tactile feedback to a user when actuating the at least one rotation control switch or the directional control switch.

2. The operating control according to claim 1, wherein the at least one rotation control switch comprises a knob attached to a top side of the user control interface box body, the knob being rotatable about a vertical axis.

3. The operating control according to claim 2, wherein the user control interface box body further includes protrusions extending parallel to the vertical axis of the at least one rotation control switch to limit travel of the at least one rotation control switch and protect the at least one rotation control switch.

4. The operating control according to claim 1, wherein the directional control switch comprises a joystick switch that includes a lever extending laterally from the user control interface box body, the lever being movable along a vertical direction and a horizontal fore/aft direction.

5. The operating control according to claim 4, wherein the user control interface box body further includes a protective housing for the lever of the joystick switch, the protective housing being configured to limit displacement of the lever of the joystick switch.

6. The operating control according to claim 1, further comprising a microcontroller in communication with the at least one rotation control switch and the directional control switch and with a controller area network of a vehicle, the microcontroller being configured to monitor the controller area network to detect a presence of a BRAKE or PARK signal transmitted over the controller area network and to disable operation of the operating control based on actuation of the rotation control switch or the directional control switch when the BRAKE or PARK signal is not present.

7. The operating control according to claim 1, wherein the at least one rotation control switch comprises two push button switches, each push button switch being configured to be actuated to control movement of the transfer seat in one direction of rotation about a vertical axis.

8. The operating control according to claim 1, wherein the directional control switch includes a D-pad switch.

9. An operating control for a transfer seat, the operating control comprising:
    at least one rotation control switch disposed on a first portion of a user control interface box body, the at least one rotation control switch configured to be actuated to control rotational movement of the transfer seat about an axis; and
    a directional control switch disposed on a second portion of the user control interface box body, the directional control switch configured to be actuated to control forward and rearward movement of the transfer seat base and upward and downward movement of the transfer seat,
    wherein the at least one rotation control switch comprises a knob attached to a top side of the user control interface box body, the knob being rotatable about a vertical axis,
    wherein the user control interface box body further includes protrusions extending parallel to the vertical axis of the at least one rotation control switch to limit travel of the at least one rotation control switch and protect the at least one rotation control switch.

10. The operating control according to claim 9, wherein the first portion of the user control interface box body comprises a forward half of the user control interface box body and the second portion of the user control interface box body comprises a rearward half of the user control interface box body, and
    the user control interface box body is configurable for both driver and passenger side applications.

11. The operating control according to claim 10, wherein the forward half and the rearward half of the user control interface box body are shaped differently to provide tactile feedback to a user when actuating the at least one rotation control switch or the directional control switch.

12. The operating control according to claim 9, wherein the directional control switch comprises a joystick switch that includes a lever extending laterally from the user control interface box body, the lever being movable along a vertical direction and a horizontal fore/aft direction.

13. The operating control according to claim 12, wherein the user control interface box body further includes a protective housing for the lever of the joystick switch, the protective housing being configured to limit displacement of the lever of the joystick switch.

14. The operating control according to claim 9, further comprising a microcontroller in communication with the at least one rotation control switch and the directional control switch and with a controller area network of a vehicle, the microcontroller being configured to monitor the controller area network to detect a presence of a BRAKE or PARK signal transmitted over the controller area network and to disable operation of the operating control based on actuation of the rotation control switch or the directional control switch when the BRAKE or PARK signal is not present.

15. The operating control according to claim 9, wherein the at least one rotation control switch comprises two push button switches, each push button switch being configured to be actuated to control movement of the transfer seat in one direction of rotation about the vertical axis.

16. The operating control according to claim 9, wherein the directional control switch includes a D-pad switch.

17. An operating control for a transfer seat, the operating control comprising:
　　at least one rotation control switch disposed on a first portion of a user control interface box body, the at least one rotation control switch configured to be actuated to control rotational movement of the transfer seat about an axis; and
　　a directional control switch disposed on a second portion of the user control interface box body, the directional control switch configured to be actuated to control forward and rearward movement of the transfer seat base and upward and downward movement of the transfer seat, wherein the at least one rotation control switch comprises two push button switches, each of the push button switches being configured to be actuated to control movement of the transfer seat in one direction of rotation about a vertical axis.

18. The operating control according to claim 17, wherein the first portion of the user control interface box body comprises a forward half of the user control interface box body and the second portion of the user control interface box body comprises a rearward half of the user control interface box body, and
　　the user control interface box body is configurable for both driver and passenger side applications.

19. The operating control according to claim 18, wherein the forward half and the rearward half of the user control interface box body are shaped differently to provide tactile feedback to a user when actuating the at least one rotation control switch or the directional control switch.

20. The operating control according to claim 17, wherein the at least one rotation control switch comprises a knob attached to a top side of the user control interface box body, the knob being rotatable about a vertical axis.

\* \* \* \* \*